US012719801B2

(12) United States Patent
Neumann et al.

(10) Patent No.: US 12,719,801 B2
(45) Date of Patent: Aug. 25, 2026

(54) INITIALIZING OF A SYSTEM ARRANGEMENT FOR THE PACKET-BASED TRANSFER OF DATA

(71) Applicant: INOVA SEMICONDUCTORS GMBH, Munich (DE)

(72) Inventors: Roland Neumann, Bad Toelz (DE); Fabian Kluge, Perasdorf (DE)

(73) Assignee: INOVA SEMICONDUCTORS GMBH, Munich (DE)

( * ) Notice: Subject to any disclaimer, the term of this patent is extended or adjusted under 35 U.S.C. 154(b) by 139 days.

(21) Appl. No.: 18/785,543

(22) Filed: Jul. 26, 2024

(65) Prior Publication Data

US 2024/0388537 A1 Nov. 21, 2024

Related U.S. Application Data

(63) Continuation of application No. PCT/EP2023/059295, filed on Apr. 6, 2023.

(30) Foreign Application Priority Data

Sep. 27, 2022 (EP) .................................... 22198218

(51) Int. Cl.
*H04L 47/22* (2022.01)
*H04L 12/40* (2006.01)

(52) U.S. Cl.
CPC .............. *H04L 47/22* (2013.01); *H04L 12/40* (2013.01); *H04L 47/225* (2013.01); *H04L 2012/40273* (2013.01)

(58) Field of Classification Search
CPC ....... H04L 47/22; H04L 47/225; H04L 12/40; H04L 2012/40273

(Continued)

(56) References Cited

U.S. PATENT DOCUMENTS 9,043,509 B2 5/2015 Frazier et al.
2002/0097726 A1* 7/2002 Garcia-Luna-Aceves .................. H04L 47/724 370/395.31

(Continued)

FOREIGN PATENT DOCUMENTS

EP 1993237 B1 6/2016

OTHER PUBLICATIONS

International Search Report issued by the European Patent Office for International Patent Application No. PCT/EP2023/059295, dated Jul. 5, 2023, with an English translation.

*Primary Examiner* — Ruolei Zong
(74) *Attorney, Agent, or Firm* — Myers Wolin, LLC

(57) ABSTRACT

A method is provided for initialising a system arrangement or a data channel, where packet-based data transmissions are optimised in such a way that they have a deterministic latency time. In addition, it is ensured that a single physical data line can be used, although 128 lines may be implemented. Due to the frame-based transmission, the latency of the data transmission is not linked to the bandwidth of the transmission channel. Thus, a deterministic latency time is achieved via a single physical communication channel, which in turn is particularly advantageous in automobiles, where weight savings are necessary to increase the range of the automobile. Also provided is an appropriately configured system arrangement as well as a computer program product and a memory-readable medium with control commands which implement the method or operate the system arrangement.

15 Claims, 5 Drawing Sheets

(58) Field of Classification Search
USPC .......................................................... 709/238
See application file for complete search history.

(56) References Cited

U.S. PATENT DOCUMENTS

2002/0186660 A1* 12/2002 Bahadiroglu ......... H04L 69/163
370/468
2008/0159150 A1* 7/2008 Ansari .................... H04L 47/26
370/238
2008/0232366 A1* 9/2008 He .......................... H04L 47/22
370/389
2009/0144424 A1* 6/2009 Takeda .................. H04L 69/329
709/226
2022/0174022 A1* 6/2022 Sivaraj .................. H04L 47/365
2023/0353427 A1* 11/2023 Wu ......................... H04L 45/22
2024/0106739 A1* 3/2024 Rajagopalan ......... H04L 45/306

* cited by examiner

| | | | |
|---|---|---|---|
| VP | 7 | Virtual Path Identifier | |
| SN | 3 | Running Serial Nr. | |
| CT | 2 | Cell Type | |
| HCRC | *10* | Header CRC | HD=5; max:21 Bit; p=0x2b9 |
| PI | 3 | Paload Info | |
| PL | 187 / 411 / 635/ 859 | Payload | |
| PCRC | *12* | Payload CRC | HD=4; max:2035 Bit; p=0x8f3 |

Fig. 3

| L | B | P |
| --- | --- | --- |
| - | - | 187 |
| - | + | 411 |
| + | - | 635 |
| + | + | 859 |

Fig. 4A

| L | B | P |
| --- | --- | --- |
| - | - | 187 |
| + | - | 411 |
| - | + | 635 |
| + | + | 859 |

Fig. 4B

| | DATA | SYMBOL(S) | |
|---|---|---|---|
| 0 | 00000000000000 | 1111010000001011 | 0000101111110100 |
| 1 | 00000000000001 | 1111001000001101 | 0000110111110010 |
| 2 | 00000000000010 | 1111000100001110 | 0000111011110001 |
| ... | ... | | |
| ... | ... | | |
| 16381 | 11111111111101 | 1011110001000011 | 0100001110111100 |
| 16382 | 11111111111110 | 1011101101000100 | 0100010010111011 |
| 16383 | 11111111111111 | 1101110100100010 | 0010001011011101 |

Fig. 5

INITIALIZING OF A SYSTEM ARRANGEMENT FOR THE PACKET-BASED TRANSFER OF DATA

CROSS REFERENCE TO RELATED APPLICATIONS

This application is a continuation of International Application No. PCT/EP2023/059295, filed Apr. 6, 2023, which takes priority from European Patent Application No. 22198218.4, filed Sep. 27, 2022, the entire contents of each of which are incorporated by reference herein.

FIELD OF THE INVENTION

The present invention is directed to a method for initialising a system arrangement or a data channel, whereby packet-based data transmissions are optimised in such a way that they have a deterministic latency time. In addition, it is ensured that a single physical data line can be used, although 128 lines have to be implemented. Due to the packet-based transmission, the latency time of the data transmission can be controlled independently of the bandwidth of the transmission channel. Thus, a deterministic latency time is achieved via a single physical communication channel, which in turn is particularly advantageous in automobiles, since weight savings are necessary to increase the range of the automobile, especially in e-mobility. The present invention is also directed to an appropriately configured system arrangement as well as a computer program product and a computer-readable medium with control commands which implement the method or operate the system arrangement.

BACKGROUND

U.S. Pat. No. 9,043,509 B2 shows network adjustments depending on latency specifications.

EP 1 993 237 B1 shows a circuit for use in a multimedia server module that can be coupled to a large number of multimedia sources that produce at least one multimedia signal.

Packet-based data transmission is known from the state of the art, although the underlying hardware is not subject to any weight restrictions. For example, network couplings are known that are realised via a certain number of data cables. Here, however, the weight is typically of secondary importance and redundant data lines or data paths are proposed in a computer network. However, these network-based data transmissions, including the implied topology and architecture, cannot be used in automobiles due to the special requirements.

The data transmission solution for the use case in the car must have maximum efficiency (minimum overhead) in terms of bandwidth utilisation. In addition, it must be possible to transmit many (>100) data paths in parallel via a physical medium (optical fibre or electrical cable). The data paths must be independent of each other.

Data paths with low latency must not require a high bandwidth; this is not possible with pure frame-based or TDM systems (low latency is bought by a fixed allocation of bandwidth).

Data paths must have a deterministic latency time. Deterministic data paths are not possible in systems with possible collisions on the physical layer or in systems with flexible data routing (Ethernet).

Systems with inefficient line coding (e.g. 8B/10B=25% overhead) have too high an overhead for high bit rate data transmissions.

Variable (data) packet lengths require too much overhead to recognise them during data recovery (from the serial data stream).

There is therefore a need in the automobile to create a process that enables a deterministic latency time to be achieved with little technical effort, both on the hardware side and on the software side, and to take into account the parameters of the data line.

Accordingly, it is a task of the present disclosure to propose a method for initialising a system arrangement, a communication channel or a data transmission, which makes it possible to achieve a deterministic latency time while causing a minimum of effort. Furthermore, it is a task of the present disclosure to propose a correspondingly equipped system arrangement as well as a computer program product and a computer-readable medium with control commands which implement the method or operate the system arrangement.

SUMMARY

The problem may be solved in accordance with this disclosure.

Accordingly, a method is proposed for initialising a system arrangement for packet-based transmission of data on up to 128 virtual paths via a physical data channel of an automobile with deterministic latency, comprising reading out a provided latency specification and/or a bandwidth specification of the data channel for in each case all virtual data paths for transmission of a bit sequence to be transmitted; and setting a packet length for each of the 128 data paths, taking into account four predefined packet lengths of the bit sequence, the packet length being selected in each case such that short packet lengths are used for short latency requirements and low available bandwidth and long packet lengths are selected for long latency requirements and high available bandwidth, the data to be transmitted being n*112 bits+187 bits.

According to embodiments of the invention, it is proposed to initialise a system arrangement or to initialise a data channel in order to carry out packet-based data transmission on it. While a single physical data channel is specified, up to 128 virtual data paths are possible on this channel, which connect different data sources with data sinks. An identifier of a virtual path can be used for this purpose and/or corresponding addresses can be used. Initially, the data channel or the data transmission is not necessarily characterised by certain characteristics, but rather any bandwidth is available and the latency times are non-deterministic. The present method takes into account the bandwidth provided and ensures that the data transmissions are then deterministic in terms of latency.

In a preparatory process step, a provided latency time specification and/or a bandwidth specification of the data channel is read out. The latency time specification can arise from an application scenario and, in this respect, a data memory can be used to store the expected latency time for each channel. In addition, the specification can be influenced by the data channel itself, so that only latency times within a predetermined range are possible. The data channel can also specify a certain bandwidth that is required. The bandwidth specification can also originate from an application scenario in such a way that it specifies how much bandwidth is required. The latency specification and/or the bandwidth specification can also be based on the number of occupied virtual data paths in such a way that the data paths divide up certain system parameters among themselves.

In general, it is not necessary for the latency specifications or the bandwidth specifications to be the same for each virtual data path. The readout of the provided latency specification and/or the bandwidth specification can be defined separately for each virtual data path so that these parameters can vary for each virtual data path. The latency specification or bandwidth specification can also be read out in such a way that the physical data channel is measured and a corresponding specification results from the measurement. This can also be done continuously or at repeated intervals so that it is possible to adjust the latency or bandwidth specification over time.

A packet length is then set for each of the 128 virtual data paths, taking into account four predefined packet lengths of the bit sequence. The length of the selected packet length is therefore set for each virtual data path. Empirically, it has been found that exactly four predefined packet lengths are particularly advantageous. This makes it possible to consider a greatly reduced number of packet lengths, namely exactly four, and is still sufficient to carry out a trade-off between the latency specification provided and the bandwidth specification.

The packet length is selected in such a way that short packet lengths are used for short latency requirements and low available bandwidth. Similarly, long packet lengths are selected for long latency requirements and high available bandwidth. This process step is based on the idea that smaller or shorter packets can be transmitted faster, and in this respect these are selected for short latency requirements. A short latency requirement corresponds to a numerically low latency requirement; short latency times are therefore required. In general, a low latency requirement is referred to as a short latency requirement. With a low latency requirement, a short latency is required. With higher or longer latency requirements, a higher latency is expected. According to the terminology used, a low requirement does not lead to a high latency. Similarly, a high requirement does not lead to a low latency.

The packet length, for example, refers to the number of bits available per packet. If larger bandwidths are available, long packet lengths are selected, as larger amounts of data are to be transmitted, which then also require a higher bandwidth. The parameters listed can also be influenced by other parameters. For example, the choice of packet length can also be influenced by the total amount of data to be transmitted. Larger bandwidths and therefore longer packet lengths are suitable for larger data volumes.

According to one aspect of the present invention, the amount of overhead data is reduced by increasing the packet length. This has the advantage that a so-called excess of data can also be determined during encoding and that the packet length can also be influenced depending on the amount of data to be transmitted. If, for example, the amount of data to be transmitted increases, a higher packet length can be selected than that which was initially set. If it is therefore recognised that the surplus is too high or can be minimised, the packet length is increased. A so-called excess data volume is a data volume that does not refer directly to the user data, but describes the data that is required for coding or data transmission. For example, the optimisation of a disparity in the data to be transmitted can mean that instead of a data volume of 112 bits, 128 bits now have to be transmitted. As multiples of this can also be transmitted or higher data volumes are present, the packet length can also be increased.

According to a further aspect of the present invention, the data to be transmitted is 112 bits or a multiple thereof. This has the advantage that the proposed method can be applied particularly efficiently to these data segments. For example, the encodings are particularly advantageous for 112-bit wide data segments, which are transmitted in symbols of 128 bits. If the full number of bits were to be encoded, this would result in a rapid increase in coding effort and complexity. In the present case, the data to be transmitted is limited to four packet lengths and it is easy to create a coding table during coding, which no longer has the complexity of a packet transmission using a single data length. A single data length would define the bit sequence to be transmitted, which is very long. However, the complexity of finding an encoding for this increases exponentially. The partial data lengths, for example four lengths, reduce this complexity to a much smaller number of coding options. Efficient coding is thus achieved in. In embodiments of the invention, the coding tables are therefore considerably shorter or the number of coding rules required is significantly reduced compared to a conventional coding table.

According to a further aspect of the present invention, a path identifier, a sequence number, a cell type, at least one checksum, at least one user data information and/or a further user data information are transmitted with the bit sequence to be transmitted. This has the advantage that different data fields can also be transmitted, which describe the virtual path or have a sequence number that provides an indication of the sequence of the packets. In addition, further data fields can be transmitted that indicate whether the data has been transmitted in full, such as a checksum.

According to a further aspect of the present invention, the overhead data is 25 or 37 bits. This has the advantage that a sufficient but nevertheless minimum bit length has been found which can encode all possible data which are necessary in addition to the user data load. By way of example only, reference is made here to FIG. 3, which encodes the first 5 data fields with 25 bits and also provides for an optional check number of 12 bits. It was thus empirically determined that these bit lengths are optimal and therefore no more bits than necessary are transmitted and all necessary information can still be provided.

According to a further aspect of the present invention, a stored metric is used which indicates which of the four predefined packet lengths is to be selected. This has the advantage that it is possible to store in the metric which bandwidth specification or which latency time specification leads to which packet length. This means that the appropriate packet lengths can be determined empirically and it is possible to dynamically adjust at runtime when which packet lengths are to be used. This can be done separately for all up to 128 virtual data paths.

According to a further aspect of the present invention, the metric designates the respective packet length, taking into account the bandwidth and/or the packet length to be transmitted. This has the advantage that the packet length to be transmitted is also taken into account and, in the case of larger data, a larger packet length is designated. The packet length to be transmitted is the total packet length to be transmitted, which in turn is subdivided into a packet length of the four named classes.

According to a further aspect of the present invention, a shorter packet length is selected at a lower bandwidth. This has the advantage that the bandwidth is selected sufficiently to transmit shorter packet lengths. If shorter packet lengths are present, it is typically also assumed that the total amount of data to be transmitted is lower and accordingly a low bandwidth will also be sufficient.

According to a further aspect of the present invention, a longer packet length is selected for higher bandwidth requirements. This has the advantage that more data, i.e. more user data per header data, is transmitted when more bandwidth is required. With a longer packet length and constant header data (overhead), a better data/overhead ratio is generated. A longer packet length is always advantageous when larger amounts of data are to be transmitted. The larger user data requires relatively less header data as more user data is transferred per header date.

According to a further aspect of the present invention, a short packet length is selected if there is less data to be transmitted and a long packet length is selected if there is a large amount of data to be transmitted. This has the advantage that the ratio of constant overhead or header data to user data is reduced. The packet lengths can therefore not only be selected depending on the bandwidth or latency requirements, but the size of the data to be transmitted is also taken into account. This has an influence on the choice of packet length.

According to a further aspect of the present invention, a stored metric is used which indicates which packet length is selected in which value range of the latency requirement and/or the available bandwidth. This has the advantage that the latency requirements and the bandwidths can be classified and thus the value ranges can be subdivided. Typically, a framework is specified for when a latency requirement or bandwidth is high or low. A classification is then made within this framework, on the basis of which the packet length can be selected from the four classes. The latency requirements and the bandwidth are always within certain frame ranges or value ranges into which the actual value is to be classified. Within these value ranges, it is possible to classify whether the available bandwidth or the latency requirements are low, low to medium, medium to high or high. Other classifications are also possible, based on which the metric specifies which of the four classes of packet lengths should now be used.

According to a further aspect of the present invention, a stored metric is used which indicates which packet length is selected for which latency requirement and which bandwidth. This has the advantage that a balance is created with regard to latency requirement and bandwidth, which indicates exactly when which packet length is used for each virtual data channel. The available bandwidths and latency requirements are therefore mapped to a class of the four packet lengths. The corresponding packet length is then selected.

According to a further aspect of the present invention, the four predefined user data lengths are 187 bits, 411 bits, 635 bits and 859 bits. This has the advantage that a constant packet segment length of 112 bits can be used and, in addition, header data of 25 bits can be used and, furthermore, a checksum of 12 bits can be used. In accordance with embodiments of the invention, it was determined that data of 112 bits can be encoded in a particularly advantageous way with regard to disparity in such a way that 128 bits are produced, and in this respect a bit length of 112 bits per packet segment is particularly advantageous. According to embodiments of the invention, multiples of 112 bits are now sent, depending on how large the amount of data to be transmitted is. With a bit length corresponding to a multiple of 112 bits and the multiple being equal to 2, 4, 6 or 8, the following formula results for header data of 25 bits and a checksum of 12 bits:

$$112\ \text{bit} * n - 25 - 12$$

so that when the 4 possible data packet lengths are selected, the specified values of 187, 411, 635 and 859 bits are created for the user data. This creates a particularly favourable coding and corresponds to the proposed 4 packet lengths.

According to a further aspect of the present invention, the physical data channel is operated either electrically or optically. This has the advantage that different transmission techniques are possible and yet up to 128 virtual data channels can be set up.

One aspect of the present invention is to bundle several data streams (video, audio and data) in a transport frame and transmit them serially. The different data formats not only have different bandwidth requirements, but also different latency and bit error rate requirements. In particular, the transmission of today's video data formats requires not only the transmission of pure video data and its frame information, but also the support of encryption methods such as HDCP. All of this requires many different data channels with a wide range of bandwidth, latency and bit error rate requirements. Added to this is the desire for far more complex network architectures than a simple transmitter/receiver architecture offers. Architectures with several repeaters, where data paths can begin and end, branches (Y) and the possibility of reintegrating data paths into a link are advantageous.

According to one aspect of the present invention, the technology follows the basic idea of bundling the data of the different services, but offers completely new possibilities with regard to network architectures and allows new approaches in the implementation of today's video interfaces. In addition, it can be used as a universal data transport layer, for example for transmitting Ethernet or camera data or any type of sensor data.

With a virtual path, all packets/cells take the same path, unlike IP, where a packet could reach its destination via different paths than previous and subsequent packets. Latency over a virtual path is therefore constant.

Virtual paths based on data cells also have the advantage that they can be used as multiplexing layers for different services (video, audio, Ethernet)

Virtual paths only consume bandwidth when data is actually being transferred.

The concept of virtual paths also makes it possible to realise complex and far-reaching diagnostic and network configuration functions at runtime with separate (virtual) data channels.

According to one aspect of the present invention, a virtual path layer is implemented between the physical layer (serialiser and framer) and the various application data interfaces.

According to one aspect of the present invention, this is used to multiplex the various data paths and support more complex architectures with repeaters and branches. This is essentially done in a sub-layer of the virtual path layer of the cell layer.

According to an aspect of the present invention, a further part of the virtual path layer is an application adaptation layer that performs the packetisation of video (stream) or, for example, Ethernet (packet) data into the cell format. This application adaptation layer also comprises the OAM functions for network diagnostics and management.

According to one aspect of the present invention, the technology can be the basis for transmitting a variety of data formats via a serial connection in the car (and elsewhere). It thus forms the basis for a new generation of devices.

The high serial bandwidths make it necessary to define architectures, cell formats and interfaces that enable flexible internal data bus widths in order to adapt the speed of the internal clock system to the possibilities of the chip technology.

According to one aspect of the present invention, the virtual path layer is the physical layer comprising the transmission sublayer and the physical medium sublayer, the cell layer and the application adaptation layer comprising the segmentation and reassembly sublayers and the functions for adapting the data formats to the corresponding application.

According to one aspect of the present invention, another part of the virtual path layer is the physical layer. A main task is to establish the physical connection to other physical layers. This connection is basically bidirectional. Theoretically, this connection can be realised via a wide variety of media. In practice, two serial differential GBps connections are used. In this layer, the line coding, the insertion of empty cells to decouple the cell rate from the connection rate and the integration of the cell stream into the serial frame take place.

In the cell layer, the segmented data (cell payload data) of the segmentation & reassembly sub-layer above is assembled into complete cells with header, VP identifier and CRC or cells are CRC-checked and the payload is passed on to the segmentation and reassembly sub-layer. This is also where the different cell streams of the application customisation functions are multiplexed and the cell payloads are distributed to the application customisation functions according to the VP identifier. (Feed-in/Feed-out)

According to one aspect of the present invention, multiplexing and demultiplexing of cell streams in repeaters and splitters (forwarding) also takes place in the cell layer.

According to one aspect of the present invention, the task of the application adaptation functions is to adapt the data of the application interfaces to the format of the user data field of the cell and to transmit control information to the opposite side or to transmit control information of the opposite side for the adaptation to be used (time generation, frame formation).

According to one aspect of the present invention, all virtual data paths are unidirectional, i.e. they start at an initiator and end at one or more targets. If virtual data paths logically belong together, e.g. HDCP for a video channel, and thus form a bidirectional data path, these paths should have the same VP identifiers.

The virtual data path begins with an initiator and ends with one or more targets. It is realised by the cell sublayer and executes the following functions on the virtual path:

Add/delete multiplexing

VP translation

Embodiments of the invention makes it possible to realise up to 128 virtual data paths via a common physical layer (cable/line). The data paths behave as if they were routed independently of each other via separate lines/cables. The use of one cable and one connector system for 128 data paths instead of 128 cables and connector systems saves resources (cables, connectors), potential sources of error (mechanical, electrical, EMC) and weight in the car.

Due to the cell-based transmission, the latency of the data transmission is not linked to the bandwidth of the transmission channel, as is the case with frame-based (TDM). A data path that requires little bandwidth (e.g. video encryption control HDCP) can still be transmitted with the lowest latency.

Furthermore, due to cell-based transmission, data paths only "consume" /require bandwidth when they are actually transmitting data. This is not the case with frame-based (TDM), as a fixed bandwidth is allocated to a data path.

In order to transmit data serially via an electrical or optical medium, the serial data signal must have certain characteristics. Typically, the signal must be DC-free (number of zeros and ones equal over a certain period of time) and it must have transitions from zero to one or vice versa at a certain interval to enable the receiver to synchronise the individual data bits. This is achieved by the line code. The data to be transmitted is encoded accordingly before it is sent and decoded again after it is received. The coding of the data leads to an overhead during transmission. More bits have to be transmitted than "pure" data bits. The aim is always to keep this overhead as low as possible.

In embodiments of the present invention, an 112B/128B block code was used for this purpose in accordance with one aspect of the present invention. The developed block code represents a very good compromise between the effort required to generate the code and the resulting overhead.

The encoding of 11Bit data into 128Bit symbols (line code) means an overhead of 14.28%. In comparison, a common 8B/10B line code has an overhead of 25%.

At the same time, it is still very easy to implement the line code with digital logic.

Stream Data (Continuous Data Stream)

The stream data function combines the intersection of the application clock system and the cell data clock system and the conversion of the data bit width of the application data and the cell data. The cell payload is already preformatted so that the cell footer and header fit into the first and last cell line.

Streamed data is (normally) source-synchronised. The clock domain crossing of the data path from the application clock domain to the Virtual Path Layer clock domain is performed here.

A data buffer is provided in the transmission direction, into which the source-synchronised data is written with the source clock. The segmentation layer retrieves the data from this buffer as required in order to perform the data format conversion into the N-bit wide rows of the cells. Frame data (e.g.: Hsync, Vsync, DE) is encoded in payload info bits so that the frame can be reconstructed on the receiver side.

In the receive direction, the cell data from the reassembly sublayer is written to a data buffer, whereby the cell row bit width is (with cell row bit width). The frame information is reconstructed based on the payload info bits. The source clock is regenerated, for example, using buffer fill level and clock synthesis.

If data encryption is required (HDCP), the cell data is encrypted or decrypted in this function.

Due to the different types of streamed data, such as: Audio, video with and without encryption, there may be different implementations of this basic function (e.g.: VStream In/Out; AStream In/Out; EncVStream In/Out).

The interface to the segmentation & reassembly sub-layer is the same for all functions.

Burst Data (Discontinuous Data Stream)

The burst data function combines the clock domain crossing and data bit width conversion of data from the application interface to the N bits of the cell rows. The cell row payload is already preformatted so that the cell footer and header fit into the first and last cell row.

Burst data is (normally) synchronised to an external time and has different identification signals for direction and data type (address/data/ByteEnable).

This data is normally accompanied by control lines in order to realise a specific protocol.

A data buffer is provided in the transmission direction, into which the burst data is written with the interface clock. The segmentation layer retrieves the data from this buffer as required in order to perform the data format conversion into the N-bit wide row cells.

In the receive direction, the cell data from the reassembly sublayer is written to a data buffer, whereby the cell row is bit-wide. The interface control signals are reconstructed based on the payload info bits.

The payload info bits are used to generate the control signals of the application-specific interfaces or to synchronise the protocol state machines in the application-specific interfaces.

Due to the different interfaces that provide burst-like data (SPI, I2C, MII), there may be different implementations of this basic function (e.g.: SPIBurst, I2CBurst, MIIBurst).

Accordingly, there will also be (slightly) different stream in/out interfaces, although their structure should be the same.

The problem is also solved by a system arrangement for the packet-based transmission of data on up to 128 virtual data paths via a physical data channel of an automobile with deterministic latency time, having an interface unit set up to read out a provided latency time specification and/or a bandwidth specification of the data channel for in each case all virtual data paths for the transmission of a bit sequence to be transmitted; and an initialisation unit set up for setting a packet length for each of the 128 data paths, taking into account four predefined packet lengths of the bit sequence, the packet length being selected in each case by means of a selection unit in such a way that short packet lengths are used for short latency requirements and low available bandwidth and long packet lengths are selected for long latency requirements and high available bandwidth, the data to be transmitted being n*112 bits+187 bits.

The task is also solved by a computer program product with control commands that implement the proposed method or operate the proposed device.

According to embodiments of the invention, it is particularly advantageous that the method can be used to operate the proposed devices and units. Furthermore, the proposed devices and units are suitable for carrying out the method according to embodiments of the invention. Thus, in each case the device implements structural features which are suitable for carrying out the corresponding method. However, the structural features can also be designed as process steps. The proposed method also provides steps for implementing the function of the structural features. In addition, physical components can also be provided virtually or virtualised.

BRIEF DESCRIPTION OF THE DRAWING

Further advantages, features and details of the invention are shown in the following description, in which aspects of the invention are described in detail with reference to the drawings. The features mentioned in the claims and in the description may each be essential to the invention individually or in any combination. Likewise, the above-mentioned features and the features further described herein may be used individually or in any combination. Functionally similar or identical parts or components are sometimes provided with the same reference signs. The terms "left", "right", "top" and "bottom" used in the description of the embodiments refer to the drawings in an orientation with a normally legible figure designation or normally legible reference signs. The embodiments shown and described are not to be understood as conclusive, but are of an exemplary nature to explain the invention. The detailed description is for the information of the skilled person, therefore known circuits, structures and methods are not shown or explained in detail in the description so as not to impede understanding of the present description. The figures show:

FIG. 3 shows frame panels as used according to one aspect of the present invention;

FIGS. 4A and 4B show metrics that select a length of a bit sequence according to an aspect of the present invention based on latency requirements and available bandwidth; and FIG. 5 shows an exemplary encoding of data segments to symbols, wherein 14 bits are encoded to 16 bits such that the disparity is optimised according to an aspect of the present invention.

Some of these figures show parameters which are familiar to the skilled person in the English designation and which are used as parameters and cannot be translated in this way.

DETAILED DESCRIPTION

Figure 1:
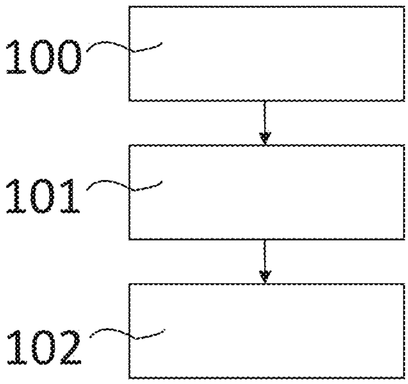
FIG. 1 shows a schematic flowchart of a method for initialising of a system arrangement for packet-based transmission of data according to one aspect of the present invention.

FIG. 1 shows a schematic flow chart of a method for initialising a system arrangement for packet-based transmission of data according to one aspect of the present invention on up to 128 virtual data paths via a physical data channel of an automobile with deterministic latency, comprising reading out 100 a provided latency specification and a bandwidth specification of the data channel for in each case all virtual data paths for transmission of a bit sequence to be transmitted; and setting 102 a packet length for each of the 128 data paths, taking into account four predefined packet lengths of the bit sequence, the packet length being selected 101 in each case in such a way that short packet lengths are used for short latency requirements and low available bandwidth and long packet lengths are selected for long latency requirements and high available bandwidth, the data to be transmitted being n*112 bits+187 bits.

Figure 2:
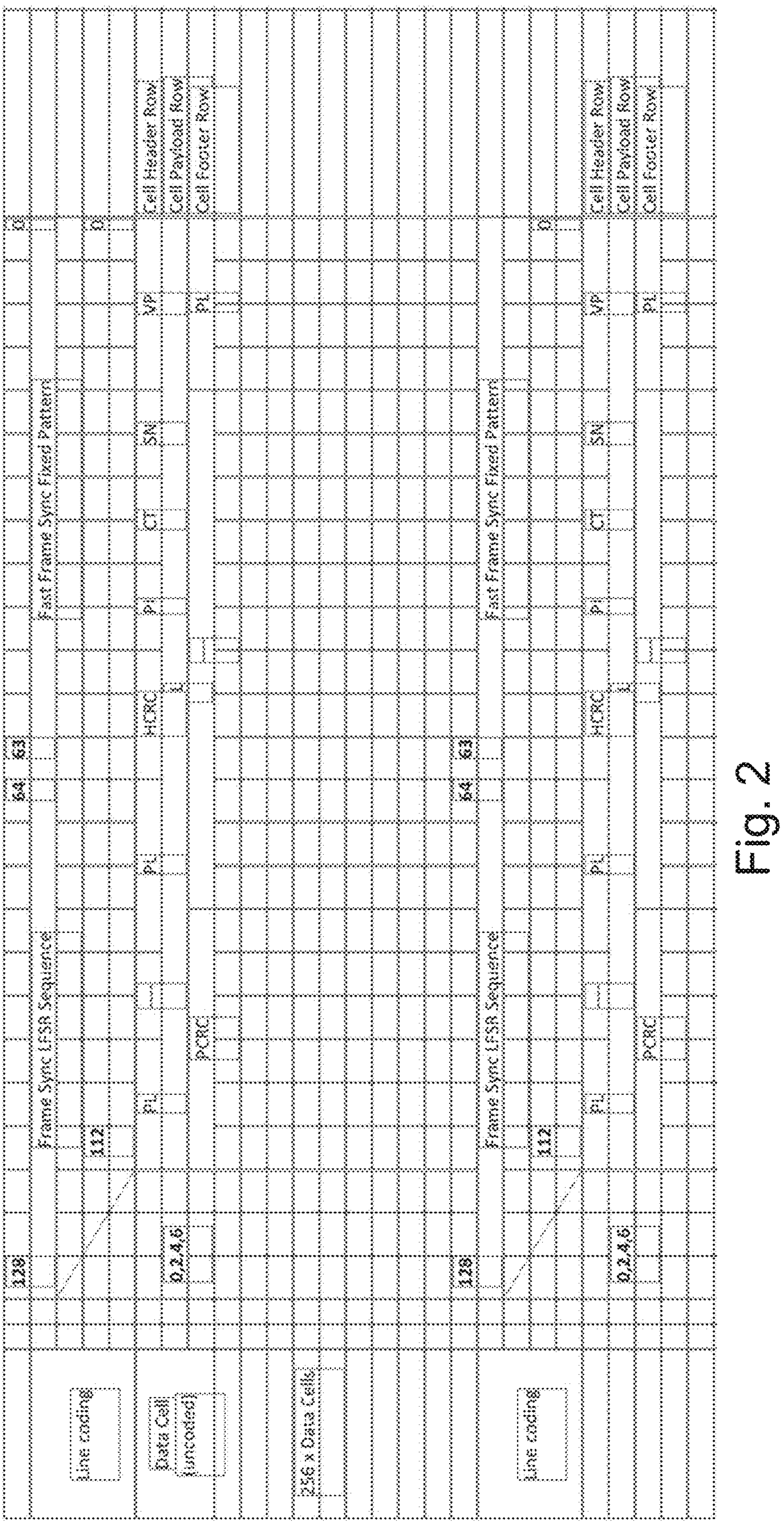
FIG. 2 shows a frame format used in the proposed method or system arrangement according to one aspect of the present invention.

FIG. 2 shows a frame format in which 112 bits are encoded as 128 bits, resulting in a bit sequence that is optimised in terms of disparity, as shown in FIG. 5, for example. The unencoded data cells are 112 bits and are encoded to 128 bits in such a way that the disparity, i.e. the ratio of zeros and ones, is optimised. Furthermore, the run length of the symbol is limited to 7. This optimises data transmission in such a way that a corresponding bit sequence can be read out particularly advantageously in terms of the clock rate.

The transmission method combines a cell-oriented (packet-oriented) data transmission with a simple frame for synchronising the transmitter and receiver. According to one aspect of the present invention, 256 data cells are transmitted followed by a 128 bit wide synchronisation word. This synchronisation word consists of two parts, a 64 bit wide self-synchronising LFSR sequence for monitoring the synchronism of transmitter and receiver and a constant 64 bit wide synchronisation pattern for fast synchronisation of transmitter and receiver. According to one aspect of the present invention, the synchronisation pattern is unique in the entire data stream. This is ensured by the selected line coding (see later). The overhead due to synchronisation is: 128bits/(256*2*128) bits=0.2% in the worst case and 128bits/(256*8*128) bits=0.05% in the best case.

According to one aspect of the present invention, the transmission method implements 128 virtual data paths by packing the data to be transmitted from up to 128 data sources into 4 different long (configurable) cells. Each cell is given a 7-bit wide address that corresponds 1:1 with the virtual data path.

According to one aspect of the present invention, a data cell comprises a predefined, constant length header field with payload data (Cell Header Row), a payload field with configurable length (0, 2*128.4*128.6*128) (Cell Payload Row) and a constant length footer field with payload checksum and payload data.

FIG. 3 shows frame fields that can be transmitted according to embodiments of the proposed invention. In particular, this figure shows the bit lengths of the user data. These are divided into four classes or four predefined lengths of bits, with each virtual data channel transmitting data according to this length. The overhead data, which is listed in the table above and/or below the user data, is transmitted in addition to the user data. This results in a bit length of the overhead data above the user data of 25 bits and, as stated below the user data, a checksum of 12 bits can also be transmitted.

The task of the header field is to enable control of the data flow through the transmission system. A 7-bit wide address, the VP (Virtual Path Identifier), is used for this purpose. With 7 bits, 128 different data paths can be uniquely addressed. This is completely sufficient for an automotive application.

A further task of the header field is to be able to "mark" the data in the cell in order to transmit frame information such as the start/end of a data stream or burst information such as data packet no., depending on the data stream or data interface, in order to enable hardware-supported packetisation/de-packetisation of the data streams, unlike Ethernet, for example, where this task must be solved entirely in software. Hardware-supported packetisation/de-packetisation reduces the overhead for this task to a minimum, in this case 3-bit PI (payload info).

Another task of the header field is to effectively encode the length of the data field. This is done with 2Bit CT (Cell Type).

The 4 different packet lengths have been selected in order to be able to efficiently implement different bandwidths and latency requirements on the one hand and to minimise the necessary control effort on the other (2 bit cell type info per cell).

Another task of the header field is to enable an integrity check of the data stream at hardware level. For this purpose, a 3-bit SN (Running Serial No.) is generated for each cell. In other systems (Ethernet), this has to be done in software and is therefore much less efficient.

Due to the central role of the header fields for data flow and data evaluation, the header fields are protected with a 10-bit CRC in accordance with one aspect of the present invention. This achieves a Hamming distance of 5 with a maximum of 21 bits. The header is thus significantly better protected than the data. However, since the header has significantly fewer bits than the payload field, this is very efficient. Unlike Ethernet, where data and header are protected with the same (short) polynomial.

FIGS. 4A and 4B show a selection of the four underlying classes or bit lengths. The predefined packet lengths are shown on the far right, the latency requirements are shown in the left-hand column and the available bandwidth is shown in the centre. For example, if the latency requirements are low and the available bandwidth is low, a predefined packet length of the bit sequence of 187 can be selected. If, on the other hand, the latency requirement is high and the available bandwidth is high, a packet length of 859 bits can be selected. In the mixed assignments, either the metric shown in FIG. 4A or the metric shown in FIG. 4B can be selected. For low latency requirements and high bandwidth, either 411 bits or 635 bits can be selected. The same applies for a high latency requirement and low available bandwidth, where either 635 bits or 411 bits can be selected.

FIG. 5 shows an example of how 14 bits can be encoded into 16 bits in such a way that the disparity of the resulting data stream is optimised. Since optimised disparity is advantageous for data transmission, 112 bits are encoded into 128 bits according to one aspect of the present invention. Accordingly, the absolute values were also determined empirically in the proposed technical teaching.

In the present case, cells are used as a synonym for frames. These can also be packages.

Cell Format/Frame Format

According to one aspect of the present invention, the cell comprises a header with a fixed bit length, a payload area with 4 selectable bit lengths and a footer, again with a fixed bit length.

The cell structure is a sequence of bits as follows:

A 7-bit virtual path identifier (VP) that represents a unique address of the virtual path.

A 3-bit sequence number (SN) that numbers the cells consecutively in their sequence.

A 2-bit wide cell type (CT) identifier that specifies the length of the user data.

A 3-bit wide payload information (PI) that contains additional information about the payload. This can also be used to synchronise payload data and frame data or control data.

1A 10-bit wide CRC polynomial (HCRC) for error protection of the header information. The polynomial has a Hamming distance of 5 up to a bit sequence of 21 bits (P=0x2B9).

The payload (PL) range has a length of: 187, 411, 635 or 859 bits, depending on the CT value. The shortest payload is selected so that it is still larger than the largest supported (video) streaming bus width. (Should simplify the mapping of streaming data to the cell payload).

Finally, a 12-bit wide CRC polynomial (PCRC) for error protection of the user data. The polynomial has a Hamming distance of 4 up to a bit sequence of 2035 bits (P=0x8F3).

Format of the Transfer Frames

According to one aspect of the present invention, the transmission frame comprises a sequence of M-bit wide words. The frame starts with an M-bit wide "comma" word from a defined sequence of comma words for the frame alignment. This is followed by K cells. The cells consist of 2, 4, 6 or 8 N-bit wide words that carry the header, payload and footer. These N-bit wide words are coded into M-bit wide symbols (line coding).

This format is selected to enable cell data to be processed at appropriate time frequencies, provided that the serialiser/deserialiser always processes a block of M bits.

What is claimed is:

1. A method for initialising a system arrangement for the packet-based transmission of data on up to 128 virtual data paths via a physical data channel of an automobile with deterministic latency, comprising:

a readout (100) of a provided latency time specification or a bandwidth specification of the data channel for all virtual data paths for the transmission of a bit sequence to be transmitted;

a setting (102) of a packet length for each of the 128 data paths, taking into account a plurality of potential predefined packet lengths of the bit sequence, wherein the plurality comprises fewer potential predefined packet lengths than the number of data paths, the packet length being selected (101) from the plurality of potential predefined packet lengths in each case in such a way that short packet lengths are used for short latency requirements and low available bandwidth and long packet lengths are selected for long latency requirements and high available bandwidth, the data to be transmitted being n*112 bits+187 bits, where n is a natural number, wherein the physical data channel is implemented as a physical cable or line.

2. The method of claim 1, wherein the amount of overhead data is reduced by increasing the packet length.

3. The method of claim 1, wherein a path identifier, a sequence number, a cell type, at least one checksum, at least one user data information item or a further user data information item are transmitted with the bit sequence to be transmitted.

4. The method of claim 1, wherein the overhead data is 25 or 37 bits.

5. The method of claim 1, wherein a stored metric is used which indicates which of the four predefined packet lengths is to be selected.

6. The method of claim 5, wherein the metric designates the respective packet length and takes into account the bandwidth or the packet length to be transmitted.

7. The method of claim 1, wherein a shorter packet length is selected for a low bandwidth.

8. The method of claim 1, wherein a longer packet length is selected for a higher bandwidth.

9. The method of claim 1, wherein a short packet length is selected for a low number of data to be transmitted and a long packet length is used for a high number of data to be transmitted.

10. The method of claim 1, wherein a stored metric is used which indicates which packet length is selected in which value range of the latency requirement or the available bandwidth.

11. The method of claim 1, wherein a stored metric is used which indicates which packet length is selected for which latency requirement and which bandwidth.

12. The method of claim 1, wherein the physical data channel is operated either electrically or optically.

13. The method of claim 1, wherein the plurality of potential predefined packet lengths comprises four predefined packet lengths.

14. The method of claim 13, wherein the four predefined packet lengths are 187 bits, 411 bits, 635 bits and 859 bits.

15. A computer program product comprising a non-transitory storage medium and instructions stored on the non-transitory storage medium which, when the program is executed by at least one computer, cause the computer to perform the steps of the method of claim 1.

* * * * *